US006766169B2

(12) United States Patent
Cooper

(10) Patent No.: US 6,766,169 B2
(45) Date of Patent: Jul. 20, 2004

(54) SCHEDULING ACQUISITION ATTEMPTS OF SERVICE PROVIDING SYSTEMS

(75) Inventor: Rotem Cooper, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 171 days.

(21) Appl. No.: 10/001,616

(22) Filed: Oct. 30, 2001

(65) Prior Publication Data

US 2003/0083064 A1 May 1, 2003

(51) Int. Cl.$^7$ .............................. H04M 1/00; H04B 1/38
(52) U.S. Cl. ............................... 455/435.2; 455/552.1; 455/432.1; 455/435.1; 455/168.1
(58) Field of Search .................. 455/432.1, 432.2, 455/432.3, 434, 435, 435.2, 435.3, 440, 425, 422.1–426.2, 418, 525, 512, 552.1, 186.1, 168.1, 188.1; 370/319–321, 335–337, 344–347, 441–442, 465, 229, 418–420

(56) References Cited

U.S. PATENT DOCUMENTS

| 4,112,257 | A | * | 9/1978 | Frost ........................... 455/437 |
| 5,261,117 | A | * | 11/1993 | Olson .......................... 455/510 |
| 5,586,338 | A | * | 12/1996 | Lynch et al. ................. 455/433 |
| 5,613,213 | A | * | 3/1997 | Naddell et al. ........... 455/435.2 |
| 5,629,975 | A | * | 5/1997 | Tiedemann et al. ...... 455/435.1 |
| 5,754,542 | A | | 5/1998 | Ault et al. |
| 5,870,674 | A | * | 2/1999 | English .................... 455/432.2 |
| 5,915,214 | A | * | 6/1999 | Reece et al. ............. 455/435.2 |
| 6,003,073 | A | * | 12/1999 | Solvason ..................... 709/219 |
| 6,029,071 | A | * | 2/2000 | Bertocci et al. ............. 455/463 |
| 6,085,085 | A | * | 7/2000 | Blakeney et al. ......... 455/426.1 |
| 6,201,964 | B1 | * | 3/2001 | Tung et al. .............. 455/432.1 |
| 6,282,420 | B1 | | 8/2001 | Bamburak et al. |
| 6,493,554 | B1 | * | 12/2002 | Kanerva et al. ............ 455/437 |
| 6,684,082 | B1 | * | 1/2004 | McClure .................. 455/552.1 |

FOREIGN PATENT DOCUMENTS

| WO | 9917475 | 4/1999 |
| WO | 9925137 | 5/1999 |
| WO | 9940746 | 8/1999 |
| WO | 0158190 | 8/2001 |

* cited by examiner

Primary Examiner—Erika Gary
Assistant Examiner—Kamran Afshar
(74) Attorney, Agent, or Firm—Philip Wadsworth; Charles D. Brown; Howard H. Seo

(57) ABSTRACT

Methods, apparatuses and computer program products for causing a subscriber station (100) to attempt to acquire one of a plurality of systems. The subscriber station (100) first detects an event that triggers use of a system acquisition schedule. The system acquisition schedule, which can be time based or sequence based, defines when to attempt to acquire a desired system. The subscriber station (100) attempts to acquire the desired system in accordance with the system acquisition schedule. The subscriber station (100) performs other functions when the system acquisition schedule does not indicate an attempt should be made to acquire the desired system. Such other functions can include attempting to acquire other systems when the system acquisition schedule does not indicate an attempt should be made to acquire the desired system.

20 Claims, 7 Drawing Sheets

SCHEDULING ACQUISITION ATTEMPTS OF SERVICE PROVIDING SYSTEMS

BACKGROUND OF THE INVENTION

I. Field of the Invention

The present invention relates to wireless communication systems. More particularly, the present invention relates to a novel and improved method and apparatus for scheduling acquisition attempts of one or more service providing systems in a subscriber station capable of operation with a plurality of communication systems.

II. Related Art

As mobile communication systems become more prevalent in society, the demands for greater and more sophisticated service have grown. To meet the capacity needs of mobile communication systems, techniques of multiple access to a limited communication resource have been developed. The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems.

The use of CDMA techniques in a multiple access communication system is known in the art and is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", also assigned to the assignee of the present invention.

In order for service to be provided using a subscriber station, the subscriber station must first acquire a service providing system. Such service providing systems can be identified, for example, by mode (for example, CDMA, TDMA, GSM, etc.) and frequency. Many wireless subscriber stations (also known as wireless communications devices, user terminals, or mobile stations) include tables and/or lists that are used by a subscriber station when it is attempting to obtain service. For example, a subscriber station can maintain a preferred roaming list (PRL) that is maintained in such a manner that the subscriber station can readily determine which systems (preferred or negative) cover common geographical regions (that is, areas of common radio coverage). Moreover, the PRL can rank systems from most desirable to least desirable. Accordingly, subscriber stations can prioritize their attempts to acquire service such that they attempt to acquire service on more desirable systems before attempting to acquire service on less desirable systems.

Subscriber stations can also include tables or lists of the N (for example, N=10) most recently used systems (that is, the systems that were most recently used to provide service). Such a table or list is typically referred to as a most recently used (MRU) table. A subscriber station can, for example, attempt initial system acquisition (for example, after a power up) using the MRU table.

Subscriber stations typically use one or more of the above discussed tables (and/or other similar types of tables) to determine the order in which to attempt to acquire systems. For example, after power up, a subscriber station may attempt to acquire a system based on an order specified by an MRU table and/or a PRL. Similarly, after a call is dropped (for example, due to loss of signal or signal fading), a subscriber station may attempt to acquire (including re-acquire) a system based on an order specified by the MRU table and/or the PRL. More specifically, upon detecting specific events, such as power up or system loss, a subscriber station may be programmed such that the first system the subscriber station attempts to acquire (specifically in this case, re-acquire) is the last system upon which service was successfully provided (that is, the most recently used system). An example of another event that can be detected is the loss of a paging channel (for example, due to loss of signal or signal fading) while the subscriber station is in idle mode.

For example, after a subscriber station is powered up, the subscriber station first attempts to acquire service using the mode and frequency of the system upon which service was last provided when the subscriber station was last powered on (that is, prior to power down). In other words, the subscriber station first attempts to re-acquire the most recently used system before attempting to acquire one or more other systems. In this example, the acquisition of the most recently used system is attempted because it is likely that the subscriber station has remained within the same geographic region, and thus, that service can again be provided using the most recently used system.

Similarly, after a subscriber station drops a call due to loss of signal or signal fading, the subscriber station immediately attempts to re-acquire service using the mode and frequency of the system upon which service was being provided when the call was dropped. In this example, the re-acquisition of the most recently used system is attempted because it is likely that the cause of the system loss is only temporary, and thus, that service can again be provided using the most recently used system. For example, a subscriber station may lose system acquisition because the user of the subscriber station travels on an elevator for a few seconds, travels behind a service blocking building for a few seconds, or travels in an underground tunnel for a few minutes. In each of these examples, successful re-acquisition of the most recently used system is likely once the user, for example, exits the elevator, is no longer behind the building, or exits the underground tunnel.

Some prior subscriber stations, designed by the assignee of the present invention, are adapted to alternate between the most recently used system and other systems when attempting to acquire (including re-acquire) a system. More specifically, the subscriber station's first attempt is to acquire service on the most recently used system, the second attempt is to acquire an alternative system, the third attempt to acquire the most recently used system, the fourth attempt is to acquire another alternative system, the fifth attempt to acquire the most recently used system, the sixth attempt is to acquire a further alternative system, and so on. The order in which the subscriber station attempts to acquire service on the alternative systems can be based on various algorithms that are known in the art. Once all alternative systems are attempted in accordance with one of such algorithms, the above described alternating with the most recently used system is stopped and acquisition is attempted based only on an algorithm that does not give such repeated high priority to the most recently used system. Even though the above described method of alternating between the most recently used system and alternative systems (referred to hereafter as the "alternating method") has proved useful, this alternating method has some drawbacks.

First, since the alternating method is based on an alternating sequence scheme, it is dependent on the processing speed of the subscriber station's hardware. More specifically, if a subscriber station operates at a high speed, the subscriber station may alternate between the most recently used system and all of the hypothesized available alternative systems in only a few seconds. As mentioned above, the alternating method stops after unsuccessful attempts to acquire all the hypothesized available alternative systems. Thus, the subscriber station may stop giving the most recently used system repeated high priority earlier than it should. For example, while the subscriber station is located in an elevator, the subscriber station may complete the alternating method and stop giving the most recently used system repeated high priority even though the most recently used system would be immediately available once the subscriber station exits the elevator. In summary, the subscriber station forgets about the lost system too quickly.

Second, since the alternating method is based on an alternating sequence scheme, it may give too much priority to the most recently used system, thereby wasting acquisition attempts and slowing down the amount of time necessary to acquire an alternative system. For example, assume a user of a subscriber station walks behind a large building that blocks service (or enters an elevator or tunnel) thereby causing the subscriber station to drop a call. Using the alternating method, the subscriber station may, for example, attempt to acquire the most recently used system three separate times, and alternative systems three times, within less than a second (depending on the processing speed of the subscriber station). However, it is unlikely that the subscriber station will be able to acquire the most recently used system if, for example, 0.3 seconds earlier the subscriber station was unable to acquire that system. In summary, the subscriber station spends too much time attempting to re-acquire the lost system, while starving other systems.

Accordingly, there is a need to improve the way subscriber stations attempt to acquire (including, re-acquire) systems.

SUMMARY OF THE INVENTION

The present invention is directed toward methods, apparatuses, and computer program products for improving the way a subscriber station attempts to acquire a service providing system. The present invention gives appropriate priority to specific systems (such as the most recently used system) without giving undue or too much priority to such specific systems.

A method of the present invention includes the step of detecting an event that triggers use of a system acquisition schedule. The system acquisition schedule defines when to attempt to acquire a desired system. The subscriber station attempts to acquire the desired system in accordance with the system acquisition schedule. The subscriber station performs other functions when the system acquisition schedule does not indicate to attempt to acquire the desired system. The present invention can also include the step of selecting the system acquisition schedule from a plurality of system acquisition schedules, wherein the selecting is based on the triggering event.

According to the present invention, a subscriber station can attempt to acquire more than one desired system in accordance with more than one system acquisition schedule. For example, while attempting to acquire a first desired system in accordance with a first system acquisition schedule, the subscriber station can detect another event that triggers use of a second system acquisition schedule. The second system acquisition schedule defines when an attempt should be made to acquire a second desired system. The subscriber station can then also attempt to acquire the second desired system in accordance with the second system acquisition schedule.

The subscriber station may attempt to acquire other systems when the system acquisition schedule does not indicate an attempt should be made to acquire the desired system. When attempting to acquire other systems the subscriber station follows alternative algorithms for prioritizing systems. It is possible that one of the "other" systems can be the desired system (if, for example, a PRL specifies an attempt should be made to acquire that system). However, in a specific embodiment, each of the other systems is different from the desired system. For example, if each system is defined by a mode/frequency combination, and the desired system is defined by a specified mode/frequency combination, then each of the other systems is defined by different mode/frequency combinations than the desired system.

System loss can be the event that triggers use of the system acquisition schedule. In this situation, the system acquisition schedule can define when an attempt should be made to reacquire the desired system whose loss triggers use of the system acquisition schedule. A power up of a subscriber station is an example of another triggering event. In this situation, the system acquisition schedule can define when an attempt should be made to acquire the desired system, the desired system being the system that was most recently used by the subscriber station.

A system acquisition schedule can be time or sequence based. More specifically, a system acquisition schedule can define specified times at which the subscriber station should attempt to acquire the desired system. Alternatively, a system acquisition schedule can define specific sequence counts according to which the subscriber station should attempt to acquire the desired system. The subscriber station performs other function at times or counts other than the specified times or counts defined by the system acquisition schedule. The "other functions" can be, as mentioned above, attempting to acquire other systems.

BRIEF DESCRIPTION OF THE DRAWINGS/ FIGURES

The features, objects, and advantages of the present invention will become more apparent from the detailed description set forth below when taken in conjunction with the drawings in which like reference characters identify the same or similar elements throughout and wherein.

DETAILED DESCRIPTION OF THE INVENTION

The present invention is described as being for use in a multi-mode subscriber station. It should be noted that although the present invention is described in the context of a subscriber station capable of operation in analog and digital environments, the present invention is equally applicable to subscriber stations only capable of operation in one environment. Similarly, it should be noted that the digital operation described in the context of code division multiple access (CDMA) operation is equally applicable to any digital communication format such as WCDMA, TDMA, FDMA, GSM, etc. Environments that support analog communications may, for example, use the Advanced Mobile Phone Service (AMPS) standards.

Figure 1:
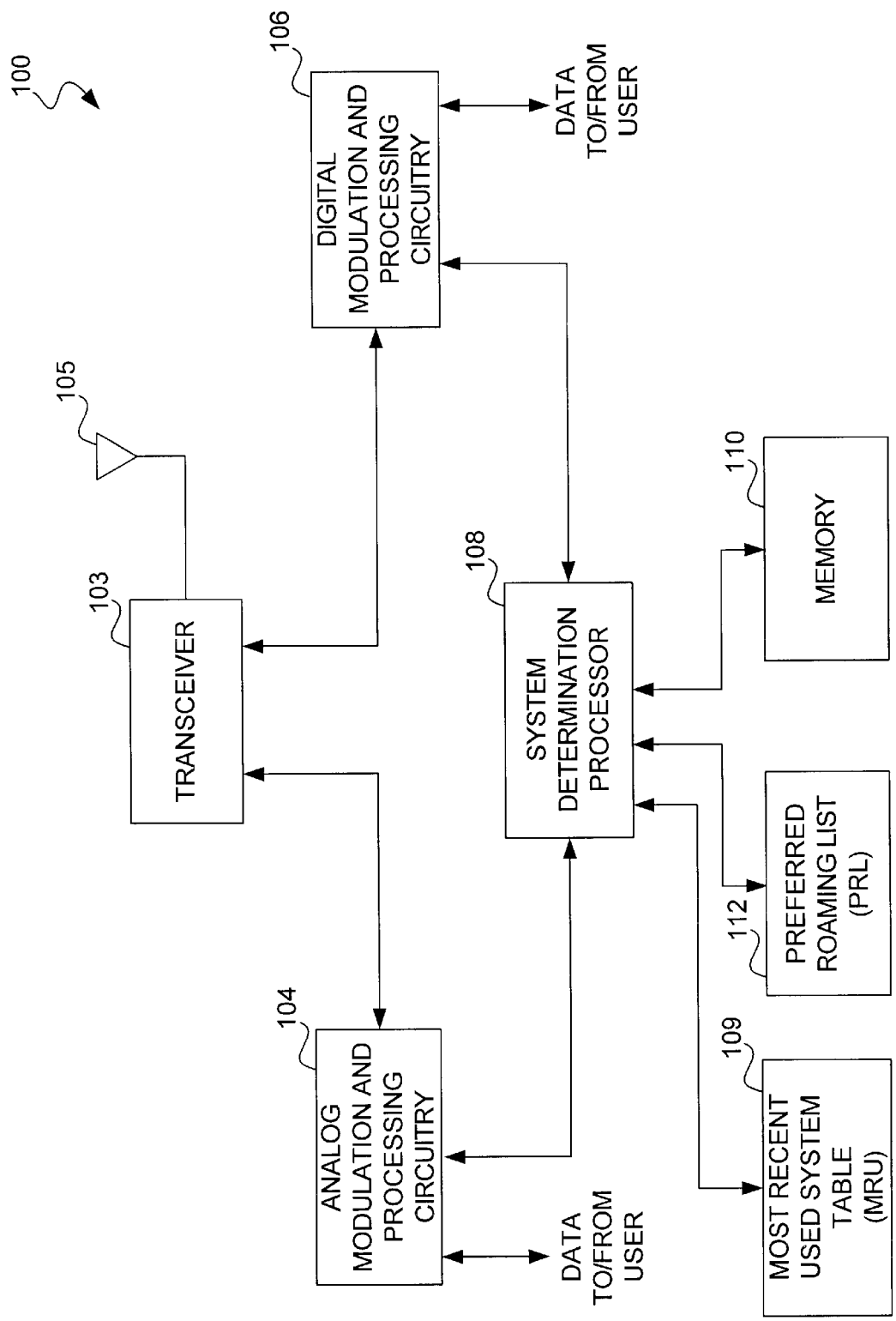
FIG. 1 is a block diagram of an exemplary multi-mode subscriber station for which the present invention is useful.

Referring to FIG. 1, when a multi-mode subscriber station (MMSS) 100 is in a system determination substate, then the operations are conducted by a system determination processor 108. In the system determination substate, system determination processor 108 selects the communication system upon which MMSS 100 is to attempt to perform acquisition and provides the necessary parameters to the acquisition circuitry. System determination processor 108 may be implemented as a microprocessor which functions under program control, for example, as discussed with reference to FIGS. 2, 3 and 5.

In an exemplary embodiment, MMSS 100 is a dual-mode subscriber station capable of both analog transmission and reception, using analog modulation and demodulation and processing circuitry (analog circuitry) 104, and digital transmission and reception, using digital modulation and demodulation and processing circuitry (digital circuitry) 106. In the exemplary embodiment, digital circuitry 106 is code division multiple access (CDMA) transmission and reception circuitry. However, other types of digital communication modes may be employed, such as WCDMA, TDMA, FDMA or GSM. The present invention is applicable to cellular communications systems, personal communication systems (PCS) and any other communication system which may provide service to a subscriber station capable of operation with various different systems.

The design of analog circuitry 104 is well known in the art and is, for example, described in detail in Mobile Cellular Telecommunications Systems by William C. Y. Lee. The exemplary embodiment of digital circuitry 106 is also well known in the art, and is described in detail in the aforementioned U.S. Pat. Nos. 4,901,307 and 5,103,459.

A most recently used (MRU) table 109 contains a list of communication systems that have been most recently used by MMSS 100. MRU table 109 can include the N (for example, N=10) most recently used systems (that is, the systems that were most recently used to provide service).

A preferred roaming list (PRL) 112 may contain system parameters for all communication systems which MMSS 100 "knows" exist. In an exemplary embodiment, PRL 112 contains information regarding both preferred and negative systems. In an exemplary embodiment, the systems stored in PRL 112 are grouped according to geographic region. Each system listed within a geographic group is then sequentially ordered from most desirable to least desirable. PRL 112 may also associate system identifiers (SIDs) with mode/frequency combinations. PRL 112 may also associate SIDs with roaming indicators.

In an exemplary embodiment, MRU 109 and/or PRL 112 are implemented in a non-volatile memory which is retained even after MMSS 100 is powered down.

Criteria for ranking systems may, for example, include cost of service, quality of service, support of unique features, etc. For each system, MRU 109 and/or PRL 112 may contain the system identification (SID) of the system along with necessary acquisition parameters, such as band, frequency, mode and any other parameters useful for performing acquisition. Alternatively, MRU 109 may only include acquisition parameters (such as frequency and mode) of the most recently used systems. In an exemplary embodiment, each system listed is tagged with an indication of whether the system is a system MMSS 100 is permitted to use (a preferred system) or a system which MMSS 100 is not permitted to use (a negative system). Each system is minimally identified by a mode (for example, analog AMPS, or CDMA digital) and a frequency (for example, A side analog, or digital frequency channel 21), collectively referred to hereafter as a "mode/frequency combination."

When MMSS 100 is powered up, or loses service, MMSS 100 attempts to acquire (or reacquire) a system as soon as possible. Within this description, the term "acquire" is meant to encompasses the term "re-acquire." That is, attempting to re-acquire a system is just one type of attempt to acquire a system. As mentioned above, information identifying potentially available systems, including the mode and frequency of the systems, is maintained in tables or lists such as MRU 109, UST 111 and/or PRL 112. Subscriber stations (such as MMSS 100) typically use the above discussed tables or lists (and/or other similar types of tables or lists) alone, or in combination, in order to determine the order in which to attempt to acquire systems.

For example, after power up, MMSS 100 may attempt to acquire a system based on an order specified by MRU table 109. Similarly, after a call is dropped (for example, due to loss of signal or signal fading), MMSS 100 may attempt to re-acquire a system based on an order specified by MRU table 109. More specifically, upon detecting specific events, such as power up or system loss, MMSS 100 may immediately attempt to acquire or re-acquire the last system on which service was successfully provided (that is, the most recently used system).

In another example, MMSS 100 builds a scan or search list using PRL table 112, MRU table 109, selected user preferences (for example, Digital Only, Analog Only), and/or a system selection algorithm. The scan or search list can identify each system by its mode/frequency combination. Examples of entries in the scan list include: analog AMPS (mode)/A side (frequency); analog AMPS (mode)/B side (frequency); digital CDMA (mode)/channel 40 (frequency); digital CDMA (mode)/channel 23 (frequency).

When MMSS 100 attempts to acquire an analog system (when in analog mode), MMSS 100 (or more specifically, analog modulation and processing circuitry 104 in combination with system determination processor 108) scans all the frequencies within a set of frequencies (for example, all frequencies in an A frequency set, or all frequencies in the B frequency set) and identifies the channel in the set that has the strongest energy and the channel that has the second strongest energy. MMSS 100 then tunes to the frequency channel having the strongest energy and attempts to demodulate a received signal. If demodulation of the signal over the strongest frequency channel is not successful, then MMSS 100 tunes to the second strongest frequency channel and attempts to demodulate a signal received on that frequency. If demodulation is successful, then the signal is said to be acquired. Once a signal is successfully acquired, then MMSS 100 detects the SID associated with the signal that was acquired. MMSS 100 can then determine whether to provide service on the acquired system (as identified by the SID) based on, for example, whether the system is a preferred or negative system.

When a subscriber station attempts to acquire a digital system (when in digital mode), MMSS 100 (or more specifically, digital modulation and processing circuitry in combination with system determination processor 108) tunes to a specific digital service frequency (for example, digital channel 23) and searches across code space to try to find a pilot signal. If a pilot signal is found, then MMSS 100 attempts to decode a synchronization channel (also referred to as a "sync channel"). If MMSS 100 successfully decodes the sync channel, then MMSS 100 determines a paging channel associated with the sync channel. Depending on the specific implementation, MMSS 100 may attempt to decode the SID from the sync channel and/or the associated paging channel (and/or other overhead channels). Once a system is successfully acquired, and MMSS 100 detects the SID associated with the system that was acquired, MMSS 100 can then determine whether to provide service on the acquired system (as identified by the SID) based, for example, on whether the system is a preferred or negative system.

MMSS 100 can also include one or more additional memory units 110 that store, for example, the system acquisition schedules of the present invention.

As shall now be explained in detail, the present invention associates one or more systems with one or more system acquisition schedules that define when MMSS 100 should attempt to acquire a specific desired system. Each system, including the desired system, can be defined by a mode/frequency combination.

Figure 2:
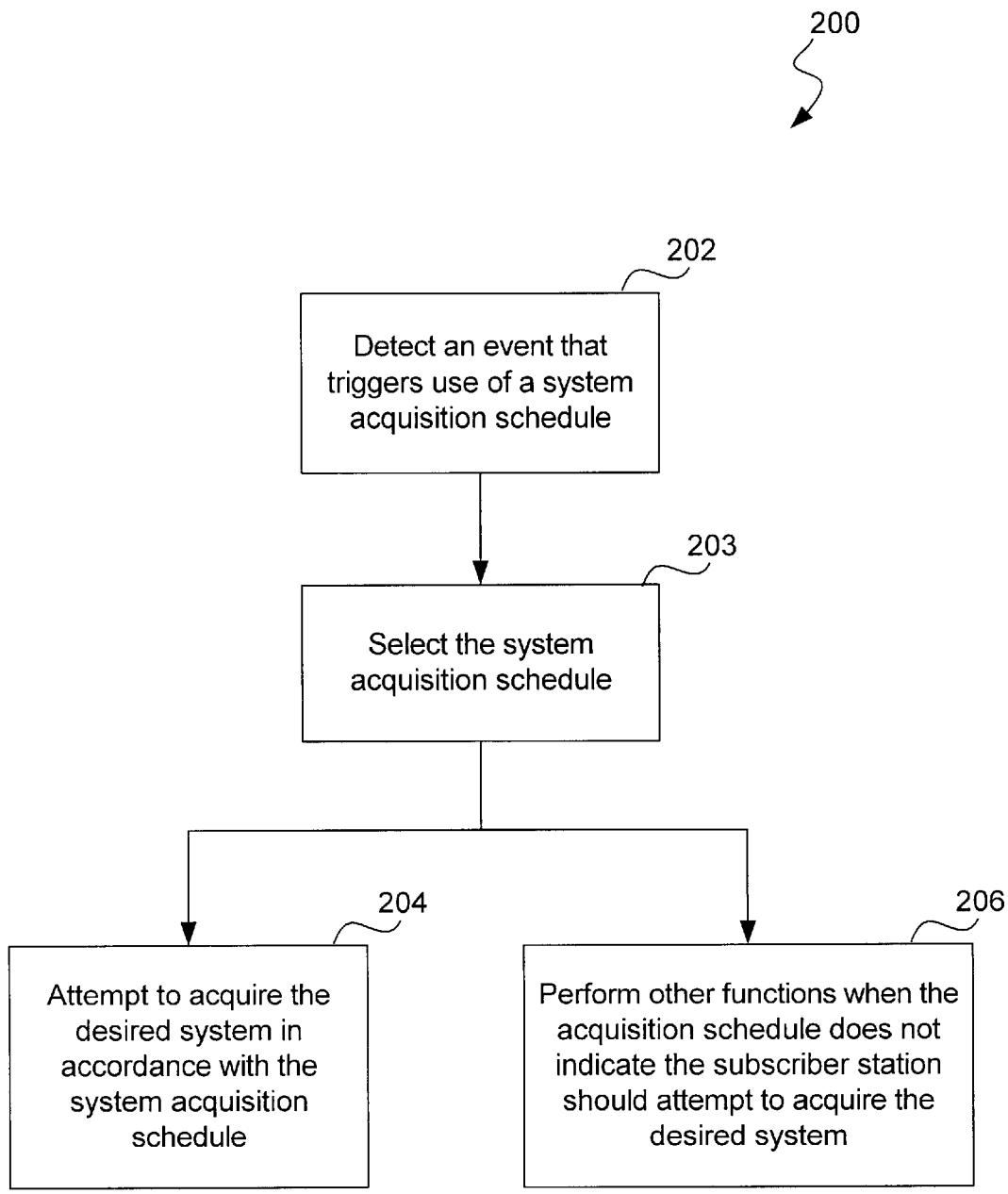
FIG. 2 is a high level flow diagram illustrating an overview of the embodiments of the present invention.

FIG. 2 includes a high level flow diagram 200 of the operation of embodiments of the present invention. Use of a system acquisition schedule of the present invention is triggered when a subscriber station (for example, MMSS 100) detects an event (also referred to as a "triggering event"), as shown at a step 202.

At a step 203, the system acquisition schedule is selected from a plurality of system acquisition schedules based on the triggering event. The system acquisition schedule defines when the subscriber station should attempt to acquire a desired system. The desired system is defined, for example, by a mode/frequency combination. A triggering event can be, for example, power up of the subscriber station, or loss of a system. If the triggering event is power up of the subscriber station, then the desired system is the most recently used system. If the triggering event is loss of a system, then the desired system is the system that was lost. A system may be considered lost, for example, if a paging channel or some other overhead channel is lost, or if a traffic channel is lost (for example, due to signal fading). In one embodiment, any type of system loss causes the selection of the same system acquisition schedule. Alternatively, there can exist a system acquisition schedule specific to the different types of system losses. For example, a first system acquisition schedule may be selected when a paging channel is lost, and a second system acquisition schedule may be selected when a traffic channel is lost.

After an event triggers use of a system acquisition schedule, at a step 204 the subscriber station attempts to acquire the desired system in accordance with the system acquisition schedule. The system acquisition schedule can be a time based system acquisition schedule or a sequence based system acquisition schedule. More specifically, as described with reference to FIGS. 3, 4A and 4B, the system acquisition schedule defines times at which the subscriber station should attempt to acquire the desired system. Alternatively, as described with reference to FIGS. 5 and 6, the system acquisition schedule defines sequences counts at which the subscriber station should attempt to acquire the desired system.

At a step 206, the subscriber station performs one or more other functions when the acquisition schedule does not indicate the subscriber station should attempt to acquire the desired system. The one or more "other functions" can be attempting to acquire other systems when the system acquisition schedule does not indicate that the subscriber station should attempt to acquire the desired system. In one embodiment, it is possible that the subscriber station may attempt to acquire the desired system while the subscriber station is attempting to acquire "other" systems. This can happen, for example, if a system selection algorithm specifies that an attempt should be made to acquire the desired system. In an alternative embodiment, each of the "other" systems is defined by different mode/frequency combinations than the desired system. That is, in the alternative embodiment the subscriber station knows not to attempt to acquire the desired system when the system acquisition schedule does not indicate that the subscriber station should attempt to acquire the desired system. Accordingly, in the alternative embodiment the subscriber station attempts to acquire only alternative systems than the desired system when the system acquisition schedule does not indicate that the subscriber station should attempt to acquire the desired system.

Another example of an "other function" that the subscriber station may perform (when the system acquisition schedule does not indicate that the subscriber station should attempt to acquire the desired system) includes entering "power save" or "sleep" mode. A further example of an "other function" that the subscriber station may perform (when the system acquisition schedule does not indicate that the subscriber station should attempt to acquire the desired system) includes obtaining channel measurements (for example, measuring the power of one or more pilot channels). These are just a few examples of "other functions," and thus, are not meant to be limiting.

Figure 3:
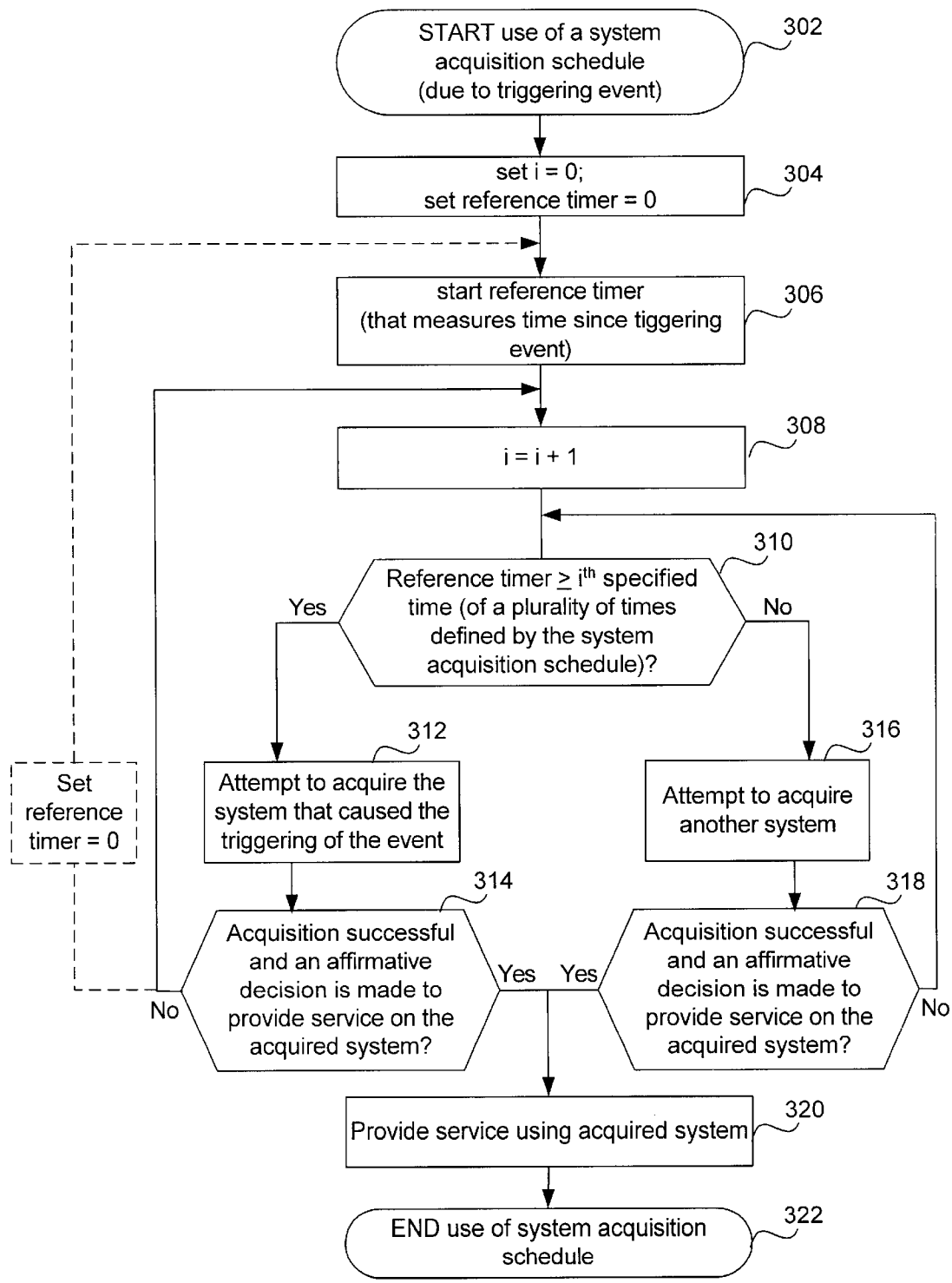
FIG. 3 is a flowchart depicting an exemplary embodiment of the present invention that utilizes time based system acquisition schedules.
Figure 4A:
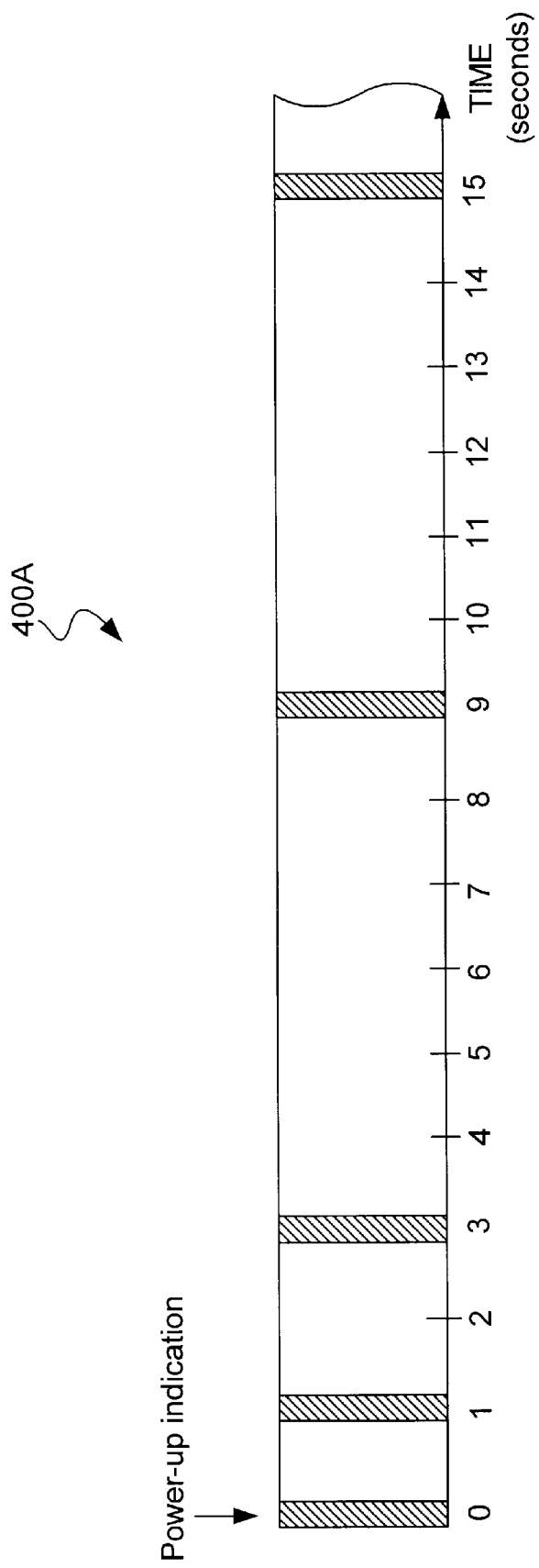
FIGS. 4A and 4B illustrate timelines that are useful for explaining the embodiment of the present invention described with reference to FIG. 3.
Figure 4B:
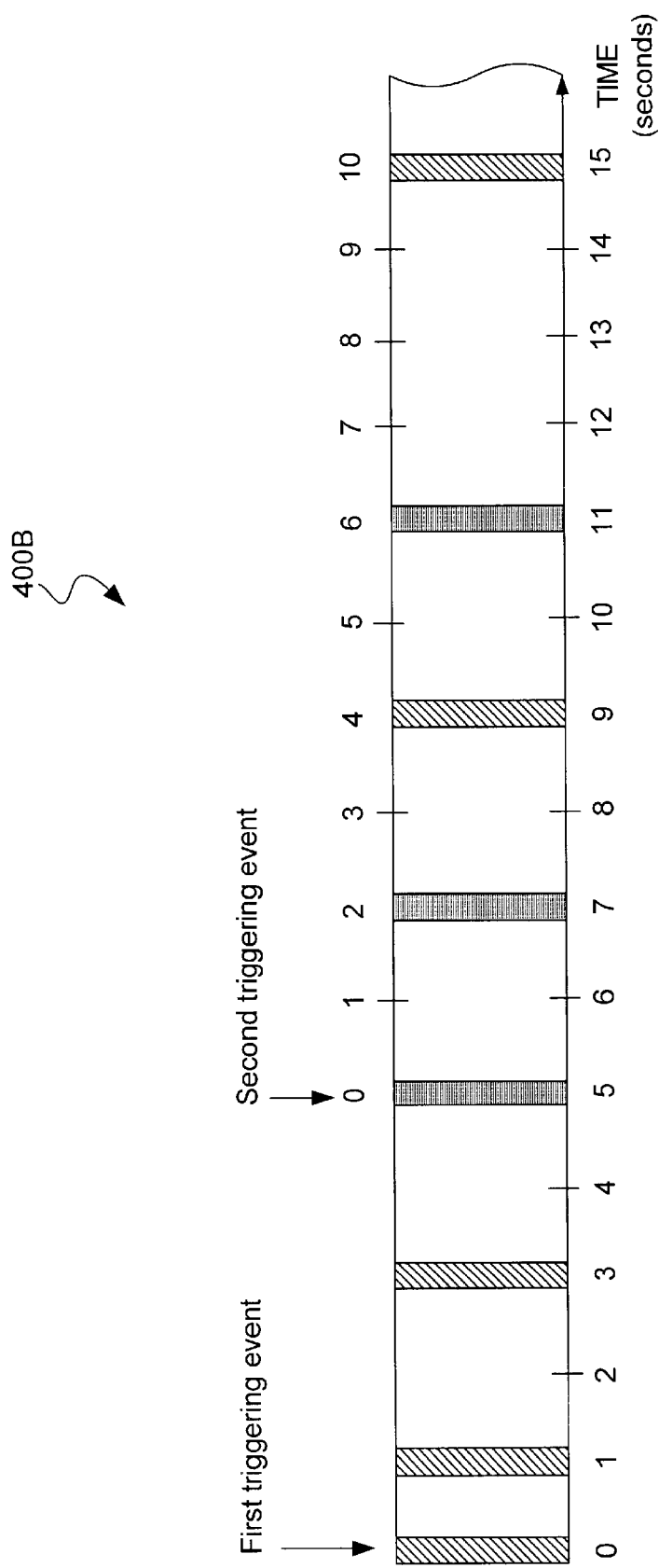
Figure 5:
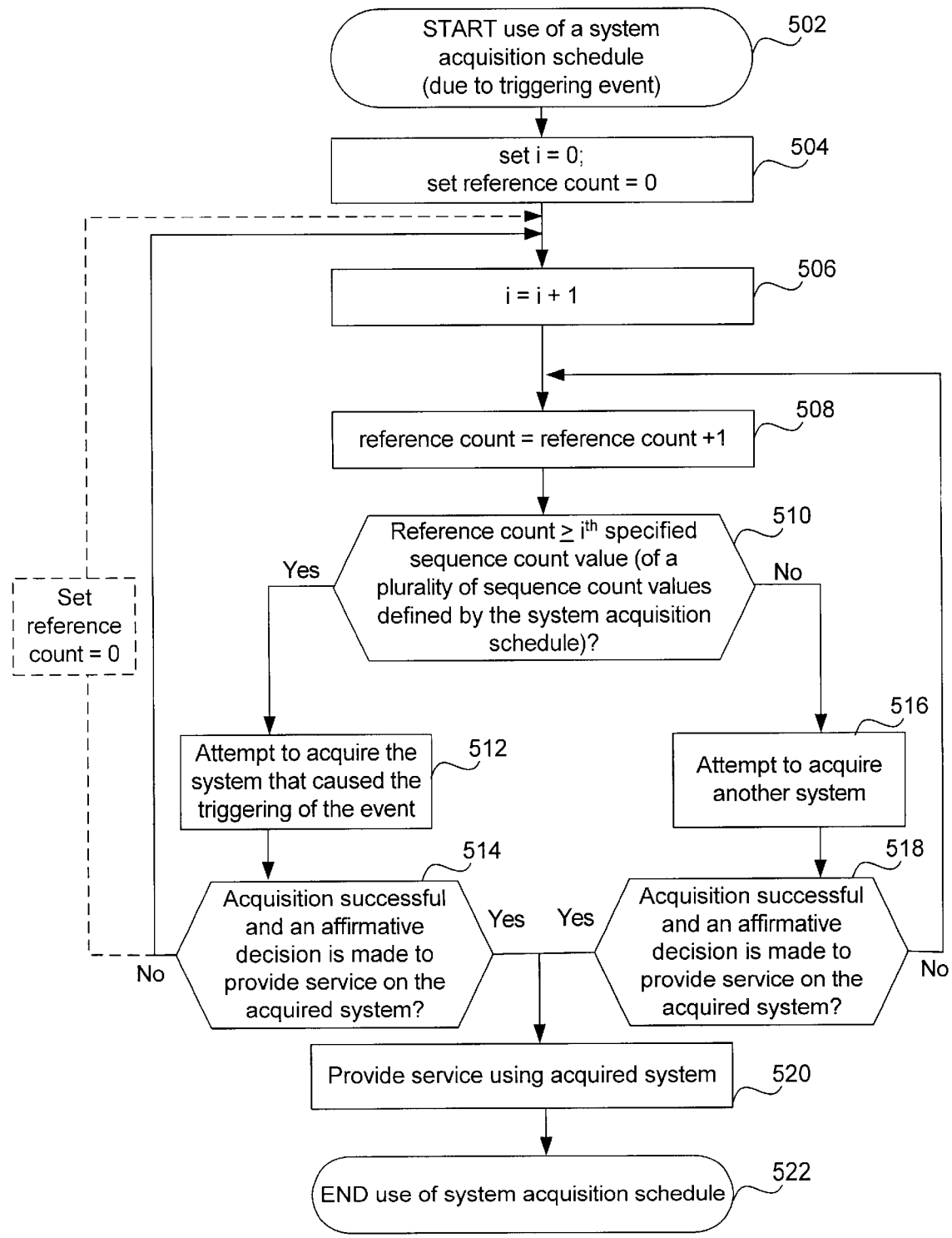
FIG. 5 is a flowchart depicting an exemplary embodiment of the present invention that utilizes sequence based acquisition schedules.
Figure 6:
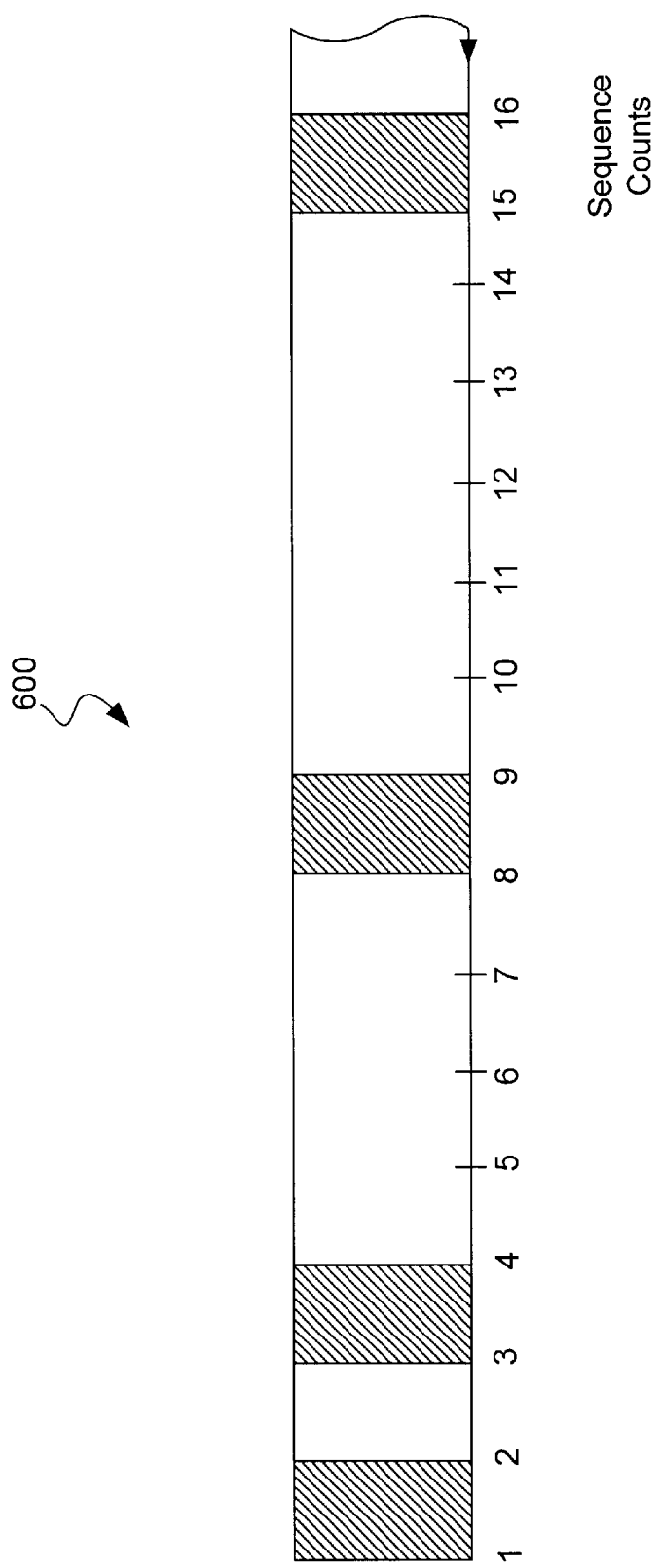
FIG. 6 illustrates a sequence line that is useful for explaining the embodiment of the present invention described with reference to FIG. 5.

With reference to FIGS. 3, 4A and 4B, the subscriber station attempts to acquire alternative systems at times not specified in the system acquisition schedule. With reference to FIGS. 5 and 6, the subscriber station attempts to acquire alternative systems at sequence counts not specified in the system acquisition schedule. The subscriber station can go through an entire list (for example, a list specified by a PRL) of alternative systems more than once while attempting to acquire a desired system in accordance with a system acquisition schedule.

The time based system acquisition schedule will now be described in more detail with reference to FIG. 3. Beginning at a step 302, the use of a system acquisition schedule is triggered upon the detection of a triggering event, some examples of which have been mentioned above.

At a next step 304, a pointer value i is initialized to equal zero, and a reference timer is initialized to zero.

At a next step 306, the reference timer is started so that the reference timer measures an amount of time since the triggering event.

At a next step 308, the pointer value i is updated or incremented according to the assignment: i=i+1.

At a next step 310, there is a determination as to whether the reference timer value is greater than or equal to the $i^{th}$ specified time of a plurality of times (for example, N distinct times) defined by the system acquisition schedule. For example, a system acquisition schedule can specify that a subscriber station should attempt to acquire a desired system at 0 seconds, 1 second, 3 seconds, 8 seconds, and 15 seconds after the triggering event (such as, power up). In this example, the $1^{st}$ specified time is 0 seconds, the $2^{nd}$ specified time is 1 second, the $3^{rd}$ specified time is 3 seconds, the $4^{th}$ specified time is 8 seconds, and the $5^{th}$ specified time is 15 seconds. Such an exemplary system acquisition schedule can be represented, for example, by the function command or script SCHED(PWR.UP, SYS, ACQ_0_1_3_8_15).

If, at step 310, the reference timer value is greater than or equal to the $i^{th}$ specified time (for example, the $1^{st}$ specified time of 0 seconds) defined by the system acquisition schedule (that is, if the answer to step 310 is YES), then flow goes to a step 312. At step 312, the subscriber station attempts to acquire the desired system. As discussed above, the desired system can be, for example, the last system that was used prior to the triggering event (for example, if the triggering event is a power up), or the system that was providing service when the triggering event occurred (for example, if the triggering event was loss of a system). One of ordinary skill in the art will appreciate that other desired systems can be selected while being within the spirit and scope of the present invention.

At a next step 314, there is a determination as to whether system acquisition was successful, and whether an affirmative decision was made to provide service on the acquired system. More specifically, when a system is successfully acquired, the subscriber station can detect the SID of the acquired system (for example, using an overhead channel). In one embodiment, the decision is made to use the acquired system only if the acquired system is the desired system. In another embodiment, the decision is made to use the acquired system if the acquired system is associated with an acceptable or preferred (that is, non-negative) SID, even if the acquired system is not the "desired system".

If the answer to step 314 is YES, then at a step 320 service is provided using the acquired system. At this point, use of the acquisition schedule can be terminated, at a step 322.

If the answer to step 314 is NO, then flow returns to step 308 where pointer value i is incremented. Flow then goes to step 310 where there is another determination as to whether the reference timer value (which is continually adjusted after the reference timer is started at step 308) is greater than or equal to the $i^{th}$ specified time (for example, the $2^{nd}$ specified time of 1 second) defined by the system acquisition schedule. If the answer to step 310 is YES, then flow goes to step 312 and the method proceeds as discussed above.

If, at step 310, the reference timer value is less than the $i^{th}$ specified time defined by the system acquisition schedule (that is, if the answer to step 310 is NO), then flow goes to a step 316. At step 316, the subscriber station attempts to acquire a system other than the desired system (for example, an alternative system). The subscriber station may select an alternative system based on one or more of the tables or lists maintained by the subscriber station. The precise manner in which the subscriber station selects an alternative system that the subscriber station will attempt acquire is not important to the present invention.

At a next step 318, there is a determination as to whether acquisition was successful, and whether an affirmative decision was made to provide service on the acquired system. More specifically, when a system is successfully acquired, the subscriber station can detect the SID of the acquired system (for example, using an overhead channel). An affirmative decision can then be made to use the acquired system, for example, if the acquired system is associated with an acceptable or preferred (that is, a non-negative) SID.

If the answer to step 318 is YES, then at step 320 service is provided using the acquired system. At this point, use of the acquisition schedule can be terminated at step 322.

If the answer to step 318 is NO, then flow returns to step 310 where there is another determination as to whether the reference timer value is greater than or equal the $i^{th}$ specified time of the plurality of times defined by the system acquisition schedule.

In the above discussed manner, the subscriber station will attempt to acquire the desired system each time the reference timer value is greater than or equal to the $i^{th}$ specified time defined by the system acquisition schedule. If the desired system (or possibly, another acceptable system) is not acquired, then the pointer value i is incremented to produce an updated $i^{th}$ pointer value. Acquisition of the desired system is not again attempted until the reference timer value is again greater than or equal to the updated $i^{th}$ specified time defined by the system acquisition schedule. At other times (that is, when the reference timer is less than the $i^{th}$ specified time), the subscriber station attempts to acquire alternative systems. Accordingly, the subscriber station attempts to acquire the desired system in accordance with the times specified by the system acquisition schedule. The subscriber station attempts to acquire other systems when the system acquisition does not specify that the subscriber station should attempt to acquire the desired system. This shall now be explained with reference to the timeline of FIG. 4A.

Referring to FIG. 4A, the partially shaded areas of timeline 400A represent times at which the subscriber station attempts to acquire the desired system. The non-shaded areas represent times at which the subscriber station attempts to acquire other systems. In this example the units of the specified times are seconds. One or ordinary skill in the art will appreciate that units other than seconds can be used while still being within the spirit and scope of the present invention.

A subscriber station can be searching for more than one desired system in accordance with more than one system acquisition schedule. For example, while the subscriber station is searching for a first desired system in accordance with a first system acquisition schedule, another event can trigger the use of a second system acquisition schedule. The second triggering event can be, for example, a synchronization channel acquisition failure. A synchronization channel acquisition failure means the subscriber station detected a pilot signal, but was a unsuccessful at decoding the synchronization channel associated with the pilot channel. Detection of the pilot channel indicates that there is a good probability that there is an accessible system associated with the pilot channel. Accordingly, a synchronization channel acquisition failure may trigger the use of a second system acquisition schedule defining when an attempt should be made to acquire a second desired system. The second desired system can be specified by the mode/frequency combination associated with the detected pilot channel. The second system acquisition schedule can define times at which the subscriber station should attempt to acquire the second desired system, wherein the times are relative to the second triggering event. Thus, use of more than one reference timer may be implemented in parallel. This concept of attempting to acquire systems in accordance with more than one system acquisition schedule shall now be explained with reference to the exemplary timeline of FIG. 4B.

Referring to FIG. 4B, the partially shaded areas of timeline 400B represent times at which the subscriber station attempts to acquire a first desired system in accordance with a first system acquisition schedule triggered by a first triggering event (for example, power up). The fully shaded areas of timeline 400B represent times at which the subscriber station attempts to acquire a second desired system in accordance with a second system acquisition schedule triggered by a second triggering event (for example, sync channel acquisition failure). The non-shaded areas represent times at which the subscriber station attempts to acquire other systems.

Each of the possible triggering events that can be identified by the subscriber station can have its own unique system acquisition schedule. For example, the second system acquisition schedule, which is triggered by a synchronization channel acquisition failure, can have a function command or script SCHED(SYS.ACK.FAIL, SYS, ACQ_0_2_6). Thus, the subscriber station will attempt to acquire the second desired system at 0 seconds, 2 seconds, and 6 seconds after the second triggering event, as shown by the fully shaded areas in example timeline 400B of FIG. 4B.

In the embodiment described with reference to FIG. 3, the system acquisition schedule defines times at which a subscriber station should attempt to acquire a desired system, wherein the times are all relative to the triggering event. For example, the exemplary function command or script SCHED(PWR.UP, SYS, ACQ_0_1_3_8_15) specifies that the subscriber station should attempt to acquire a desired system at 0 seconds, 1 second, 3 seconds, 8 seconds and 15 seconds after the triggering event of power up. In an alternative embodiment, the system acquisition schedule defines times between each successive attempt to acquire a desired system. For example, the exemplary function command or script SCHED(PWR.UP, SYS, ACQ_0_1_2_5_7) specifies that the subscriber station should attempt to acquire a desired system at 0 seconds after the triggering event, then 1 second after the previous attempt (which is 1 second after the triggering event), then 2 seconds after the previous attempt (which is 3 seconds after the triggering event), then 5 seconds after the previous attempt (which is 8 seconds after the triggering event), and then 7 seconds after the previous attempt (which is 15 seconds after the triggering event). It should be appreciated that the effect of both of these examples is to attempt to acquire the desired system at equivalent times relative to the triggering event. One of ordinary skill in the art will appreciate that the flow chart of FIG. 3 can be slightly modified to accommodate this alternative embodiment. More specifically, the reference timer should be initialized to zero after each unsuccessful attempt to acquire the desired system (that is, after each time the answer to step 314 is NO), as shown by the dashed lines in FIG. 3.

In alternative embodiments, system acquisition schedules are sequence based, rather than time based as just described above. More specifically, an embodiment where the system acquisition schedule defines sequence counts at which the subscriber station should attempt to acquire a desired system shall now be described in more detail with reference to FIG. 5. Beginning at a step 502, the use of a system acquisition schedule is triggered upon the detection of a triggering event, some examples of which have been mentioned above.

At a next step 504, a pointer value i is initialized to equal zero, and a reference counter is initialized to zero.

At a next step 506, the pointer value i is updated or incremented according to the assignment: i=i+1.

At a next step 508, the reference counter is updated or incremented according to the assignment: reference count= reference count+1.

At a next step 510, there is a determination as to whether the reference count value is equal the $i^{th}$ specified sequence count value of a plurality of sequence count values (for example, N distinct sequence count values) defined by the system acquisition schedule. For example, a system acquisition schedule can specify that a subscriber station should attempt to acquire a desired system at sequence counts 1, 3, 8 and 15. In this example, the $1^{st}$ specified sequence count is 1, the $2^{nd}$ specified sequence count is 3, the $3^{rd}$ specified sequence count is 8, and the $4^{th}$ specified sequence count is 15. Such an exemplary system acquisition schedule can be represented, for example, by the function command or script SCHED(PWR.UP, SYS, ACQ_1_3_8_15).

If, at step 510, the reference counter value is equal to the $i^{th}$ specified sequence count defined by the system acquisition schedule (that is, if the answer to step 510 is YES), then flow goes to a step 512. At step 512, the subscriber station attempts to acquire the desired system. As discussed above, the desired system can be, for example, the last system that was used prior to the triggering event (for example, if the triggering event is a power up), or the system that was providing service when the triggering event occurred (for example, if the triggering event was loss of a system). One of ordinary skill in the art will appreciate that other desired systems can be selected while being within the spirit and scope of the present invention.

At a next step 514, there is a determination as to whether acquisition was successful, and whether an affirmative decision was made to provide service on the acquired system. More specifically, when a system is successfully acquired, the subscriber station can detect the SID of the acquired system (for example, using an overhead channel). In one embodiment, the decision is made to use the acquired system only if the acquired system is the desired system. In another embodiment, the decision is made to use the acquired system if the acquired system is associated with an acceptable or preferred (that is, a non-negative) SID, even if the acquired system is not the "desired system".

If the answer to step 514 is YES, service is provided using the acquired system at a step 520. At this point, use of the acquisition schedule can be terminated, at a step 522.

If the answer to step 514 is NO, flow returns to step 506 where pointer value i is incremented. Flow then goes to step 508 where the reference count value is incremented, and then to step 510 where there is another determination as to whether the reference count value is equal to the $i^{th}$ specified sequence count (for example, the $2^{nd}$ specified sequence count of 3) defined by the system acquisition schedule. If the answer to step 510 is YES, then flow goes to step 512 as discussed above.

If, at step 510, the reference counter value is not equal to the $i^{th}$ specified sequence count defined by the system acquisition schedule (that is, if the answer to step 510 is NO), then flow goes to a step 516. At step 516, the subscriber station attempts to acquire a system other than the desired system (for example, an alternative system). The subscriber station may select an alternative system based on one or more of the tables or lists maintained by the subscriber station. The precise manner in which the subscriber station selects an alternative system that the subscriber station will attempt acquire is not important to the present invention.

At a next step 518, there is a determination as to whether acquisition was successful, and whether an affirmative decision was made to provide service on the acquired system. More specifically, when a system is successfully acquired, the subscriber station can detect the SID of the acquired system (for example, using an overhead channel). An affirmative decision can then be made to use the acquired system, for example, if the acquired system is associated with an acceptable or preferred (that is, a non-negative) SID.

If the answer to step 518 is YES, then at step 520 service is provided using the acquired system. At this point, use of the acquisition schedule can be terminated at step 522.

If the answer to step 518 is NO, flow returns to step 508 where the reference count value is incremented to produce an updated reference count value. Then, at step 510, there is a determination as to whether the updated reference count value is equal to the $i^{th}$ specified sequence count of the plurality of reference counts defined by the system acquisition schedule.

In the above discussed manner, the subscriber station will attempt to acquire the desired system when the reference count value is equal to the $i^{th}$ specified sequence count defined by the system acquisition schedule. If the desired system (or possibly, another acceptable system) is not acquired, then the pointer value i is incremented to produce an updated $i^{th}$ pointer value, and the reference count value is incremented to produce an updated reference count value. Acquisition of the desired system is not again attempted until the reference count value is again equal to the $i^{th}$ specified sequence count value defined by the system acquisition schedule. At other reference count values (that is, when the reference count value is less than the $i^{th}$ sequence count value), the subscriber station attempts to acquire alternative systems. Accordingly, the subscriber station attempts to acquire the desired system in accordance with the reference counts defined by the system acquisition schedule. In the above discussed embodiment, the reference counter is incremented each time a system acquisition attempt is unsuccessful. One or ordinary skill in the art will appreciate that other types of events can cause the reference counter to be updated. The subscriber station attempts to acquire other systems when the system acquisition does not specify that the subscriber station should attempt to acquire the desired system. This shall now be described with reference to the sequence line of FIG. 6.

Referring to FIG. 6, the shaded areas of sequence line 600 represent sequence counts at which the subscriber station attempts to acquire the desired system. The non-shaded areas represent sequence counts at which the subscriber station attempts to acquire alternative systems. The system acquisition schedule defines sequence counts at which a subscriber station should attempt to acquire a desired system, wherein the sequence counts are all relative to the triggering event. For example, the exemplary function command or script SCHED(PWR.UP, SYS, ACQ_1_3_8_15) specifies that the subscriber station should attempt to acquire a desired system at when the sequence count equals 1, 3, 8 and 15, starting from the triggering event of power up. In an alternative embodiment, the system acquisition schedule defines sequence count values between each successive attempts to acquire a desired system. For example, the exemplary function command or script SCHED(PWR.UP, SYS, ACQ1_2_5_7) can specify that the subscriber station should attempt to acquire a desired system at 1 count after the triggering event, then 2 counts after the previous attempt (which is 3 counts after the triggering event), then 5 counts after the previous attempt (which is 8 counts after the triggering event), then 7 counts after the previous attempt (which is 15 counts after the triggering event). It should be appreciated that the effect of both of these examples is to attempt to acquire the desired systems at equivalent counts relative to the triggering event. One of ordinary skill in the art will appreciate that the flow chart of FIG. 5 can be slightly modified to accommodate this alternative embodiment. More specifically, the reference counter should be initialized to zero after each unsuccessful attempt to acquire the desired system (that is, after each time the answer to step 514 is NO), as shown by the dashed lines in FIG. 5.

A subscriber station can be searching for more than one desired system in accordance with more than one sequence based system acquisition schedule. Further, a subscriber station can be searching for a first desired system in accordance with a sequence based system acquisition schedule while the subscriber station is searching for a second desired system in accordance with a time based system acquisition schedule. If both time based and sequence based system acquisition schedules are utilized, each system acquisition schedule should be specified as either a time based or sequence based system acquisition schedule.

The present invention should not be limited to use with the exemplary triggering events that have been discussed above. Any other event that can be recognized by the subscriber station can be specified as a triggering event and can have an associated system acquisition schedule. Examples of additional triggering events include: CDMA acquisition fails during the pilot channel acquisition substate; CDMA acquisition fails during the sync channel acquisition substate; AMPS acquisition attempt fails because neither of the two strongest paging channels could be acquired; AMPS acquisition fails because neither of the two strongest control channels could be acquired.

A time based system acquisition schedule is not dependent on the processing speed of a subscriber station or on the amount of time it takes to perform subscriber station functions. In contrast, a sequence based acquisition schedule is likely dependent on, and thus likely affected by, the processing speed of a subscriber station and on the amount of time it takes to perform subscriber station functions.

Features of the present invention can be performed and/or controlled by processor 108, which in effect comprises a computer system. Such a computer system includes, for example, one or more processors that are connected to a communication bus. Although telecommunication-specific hardware can be used to implement the present invention, the following description of a general purpose type computer system is provided for completeness.

The computer system can also include a main memory, preferably a random access memory (RAM), and can also include a secondary memory and/or other memory. The secondary memory can include, for example, a hard disk drive and/or a removable storage drive. The removable storage drive reads from and/or writes to a removable storage unit in a well known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

The computer system can also include a communications interface. The communications interface allows software and data to be transferred between the computer system and external devices. Software and data transferred via the communications interface are in the form of signals that can be electronic, electromagnetic, optical or other signals capable of being received by the communications interface.

As shown in FIG. 1, processor 108 is in communications with memory that stores MRU 109, PRL 112 and/or UST 111. Processor 108 is also in communications with memory 110, which can store the system acquisition schedules of the present invention. Processor 108, alone or combination with analog modulation and processing circuitry 104 and/or digital modulation and processing circuitry 106, detects triggering events that trigger the use of the system acquisition schedules of the present invention.

In this document, the terms "computer program medium" and "computer usable medium" are used to generally refer to media such as a removable storage device, a removable memory chip (such as an EPROM, or PROM) within MMSS 100, and signals. Computer program products are means for providing software to the computer system.

Computer programs (also called computer control logic) are stored in the main memory and/or secondary memory. Computer programs can also be received via the communications interface. Such computer programs, when executed, enable the computer system to perform certain features of the present invention as discussed herein. For example, features of the flow charts shown in FIGS. 2, 3 and 5 can be implemented in such computer programs. In particular, the computer programs, when executed, enable processor 108 to perform and/or cause the performance of features of the present invention. Accordingly, such computer programs represent controllers of the computer system of the subscriber station. Thus, such computer programs control, for example, the order in which system acquisition is attempted.

Where the invention is implemented using software, the software can be stored in a computer program product and loaded into the computer system using the removable storage drive, the memory chips or the communications interface. The control logic (software), when executed by processor 108, causes control processor 108 to perform certain functions of the invention as described herein.

Features of the invention may also or alternatively be implemented primarily in hardware using, for example, hardware components such as application specific integrated circuits (ASICs). Implementation of the hardware state machine so as to perform the functions described herein will be apparent to persons skilled in the relevant art(s).

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. For use with a subscriber station, a method for attempting to acquire one of a plurality of systems, comprising the steps of:
   (a) detecting an event that triggers use of a system acquisition schedule,
   (b) selecting the system acquisition schedule from a plurality of system acquisition schedules based on the triggering event and selecting the desired system based on the triggering event, wherein the system acquisition schedule defines when to attempt to acquire a desired system;
   (c) attempting to acquire the desired system in accordance with the system acquisition schedule;
   (d) performing other functions when the system acquisition schedule does not indicate to attempt to acquire the desired system;
   (e) detecting another event that triggers use of a second system acquisition schedule, wherein the second system acquisition schedule defines when to attempt to acquire a second desired system; and
   (f) attempting to acquire the second desired system in accordance with the second system acquisition schedule.

2. The method of claim 1, wherein step (d) comprises performing other functions when the system acquisition schedule does not indicate an attempt should be made to acquire the desired system and the second system acquisition schedule does not indicate an attempt should be made to acquire the second desired system.

3. The method of claim 1, wherein step (d) comprises attempting to acquire other systems when the system acquisition schedule does not indicate an attempt should be made to acquire the desired system.

4. The method of claim 3, wherein each system is defined by a mode/frequency combination, the desired system being defined by a first mode/frequency combination, and each of the other systems being defined by different mode/frequency combinations than the desired system.

5. The method of claim 1, wherein step (a) comprises detecting a system loss event that triggers use of the system acquisition schedule, and wherein the system acquisition schedule defines when to attempt to re-acquire the desired system whose loss triggers use of the system acquisition schedule.

6. The method of claim 1, wherein step (a) comprises detecting a power up event, and wherein the system acquisition schedule defines when to attempt to acquire the desired system, the desired system being the system that was most recently used by the subscriber station (100).

7. The method of claim 1, wherein the system acquisition schedule defines specified times at which the subscriber station (100) should attempt to acquire the desired system, and wherein:

step (c) comprises attempting to acquire the desired system at the specified times defined by the system acquisition schedule; and step (d) comprises performing other functions at times other than the specified times defined by the system acquisition schedule.

8. The method of claim 1, wherein the system acquisition schedule defines specific sequence counts according to which the subscriber station (100) should attempt to acquire the desired system, and wherein:

step (c) comprises attempting to acquire the desired system according to the specific sequence counts defined by the system acquisition schedule; and step (d) comprises performing other functions at sequence counts other than the specific sequence counts defined by the system acquisition schedule.

9. The method of claim 1, wherein the system acquisition schedule defines specified times at which the subscriber station (100) should attempt to acquire the desired system, and wherein:

step (c) comprises attempting to acquire the desired system at the specified times defined by the system acquisition schedule;

step (d) comprises attempting to acquire the other systems at times other than the specified times defined by the system acquisition schedule; and terminating steps (c) and (d) once the desired system, or one of the other systems, is acquired.

10. The method of claim 1, wherein the system acquisition schedule defines specific sequence counts according to which the subscriber station (100) should attempt to acquire the desired system, and wherein:

step (c) comprises attempting to acquire the desired system according to the specific sequence counts defined by the system acquisition schedule;

step (d) comprises attempting to acquire the other systems at sequence counts other than the specific sequence counts defined by the system acquisition schedule; and terminating steps (c) and (d) once the desired system, or one of the other systems, is acquired.

11. The method of claim 10, further comprising the steps of:

(e) detecting another event that triggers use of a second system acquisition schedule, wherein the second system acquisition schedule defines when the subscriber station should attempt to acquire a second desired system, the second desired system defined by a mode/frequency combination that is different than a mode/frequency combination defining the desired system;

(f) attempting to acquire the second desired system in accordance with the second system acquisition schedule; and (g) attempting to acquire the other systems when the second system acquisition schedule does not indicate the subscriber station should attempt to acquire the second desired system.

12. A computer program product comprising a computer usable medium having control logic stored therein for causing a computer of a subscriber station (100) to attempt to acquire one of a plurality of systems, the control logic comprising:

first computer readable program code means for causing the computer to use a system acquisition schedule when a triggering event is detected;

second computer readable program code means for causing the computer to select the system acquisition schedule from a plurality of system acquisition schedules based on the triggering event, wherein the system acquisition schedule defines when to attempt to acquire a desired system;

third computer readable program code means for causing the computer to attempt to acquire the desired system in accordance with the system acquisition schedule; and fourth computer readable program code means for causing the computer to perform other functions when the system acquisition schedule does not indicate an attempt should be made to acquire the desired system.

fifth computer readable program code means for causing the computer to select the desired system based on the triggering event, wherein the system acquisition schedule defines when the third computer readable program code means causes the computer to attempt to re-acquire the desired system whose loss comprises the triggering event.

13. An apparatus for use in a subscriber station (100) attempting to acquire one of a plurality of systems, the subscriber station (100) capable of wireless communications, the apparatus comprising:

detecting means for detecting an event that triggers use of a system acquisition schedule, wherein the system acquisition schedule defines when to attempt to acquire a desired system, the desired system being defined by a mode/frequency combination;

selecting means for selecting the system acquisition schedule from a plurality of system acquisition schedules based on the triggering event and for selecting a desired system based on the triggering event, wherein the system acquisition schedule defines when to attempt to acquire the desired system; and acquisition means for attempting to acquire the desired system in accordance with the system acquisition schedule, wherein the acquisition means attempts to acquire other systems when the acquisition schedule does not indicate an attempt should be made to acquire the desired system, and wherein the system acquisition schedule is a sequence based system acquisition schedule that defines when to attempt to acquire the desired system.

14. The apparatus of claim 13, wherein the system acquisition schedule is a time based system acquisition schedule that defines times at which the acquisition means is to attempt to acquire the desired system.

15. For use with a subscriber station (100), a method for attempting to acquire one of a plurality of systems, comprising the steps of:

(a) detecting an event that triggers use of a system acquisition schedule, wherein the system acquisition schedule defines specific times at which the subscriber station (100) should attempt to acquire a desired system;

(b) attempting to acquire the desired system at the specific times defined by the system acquisition schedule;

(c) attempting to acquire one or more other systems at times other than the specific times defined by the system acquisition schedule.

(d) stopping steps (b) and (c) once the system, or one of the one or more other systems, is acquired, and wherein the desired system is defined by a mode/frequency combination, and each of the one or more other systems is defined by a different mode/frequency combination.

16. The method of claim 15, wherein the desired system is a system whose loss triggers use of the system acquisition schedule.

17. The method of claim 15, wherein the event that triggers use of the system acquisition schedule comprises a power-up of the subscriber station (100), and wherein the desired system is a system that was most recently used by the subscriber station (100).

18. For use with a subscriber station (100), a method for attempting to acquire one of a plurality of systems, comprising the steps of:
   (a) detecting an event that triggers use of a system acquisition schedule, wherein the system acquisition schedule defines specific sequence steps at which the subscriber station (100) should attempt to acquire a desired system;
   (b) attempting to acquire the desired system at the specific sequence steps defined by the system acquisition schedule;
   (c) attempting to acquire the one or more other systems at sequence steps other than the specific sequence steps defined by the system acquisition schedule;
   (d) stopping steps (b) and (c) once the system, or one of the one or more other systems, is acquired, and wherein the desired system is defined by a mode/frequency combination, and each of the one or more other systems is defined by a different mode/frequency combination.

19. The method of claim 18, wherein the desired system is a system whose loss triggers use of the system acquisition schedule.

20. The method of claim 18, wherein the event that triggers use of the system acquisition schedule comprises a power-up of the subscriber station (100), and wherein the desired system is a system that was most recently used by the subscriber station (100).

* * * * *